United States Patent
Hwang et al.

(10) Patent No.: US 11,155,694 B2
(45) Date of Patent: Oct. 26, 2021

(54) POLYCARBONATE RESIN COMPOSITION AND OPTICAL MOLDED ARTICLE COMPOSED THEREOF

(71) Applicant: LG CHEM, LTD., Seoul (KR)

(72) Inventors: Daehyeon Hwang, Daejeon (KR); Young Wook Son, Daejeon (KR); Byoungkue Jeon, Daejeon (KR); Moo Ho Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 17 days.

(21) Appl. No.: 16/630,790

(22) PCT Filed: Sep. 27, 2018

(86) PCT No.: PCT/KR2018/011429
§ 371 (c)(1),
(2) Date: Jan. 13, 2020

(87) PCT Pub. No.: WO2019/066493
PCT Pub. Date: Apr. 4, 2019

(65) Prior Publication Data
US 2020/0165413 A1   May 28, 2020

(30) Foreign Application Priority Data

Sep. 29, 2017 (KR) .................. 10-2017-0128259
Sep. 21, 2018 (KR) .................. 10-2018-0114401

(51) Int. Cl.
| C08K 5/3492 | (2006.01) |
| C08L 69/00 | (2006.01) |
| C08K 5/132 | (2006.01) |
| C08K 5/3475 | (2006.01) |

(52) U.S. Cl.
CPC ............ *C08K 5/3492* (2013.01); *C08K 5/132* (2013.01); *C08K 5/3475* (2013.01); *C08L 69/00* (2013.01)

(58) Field of Classification Search
CPC .................................................. C08L 69/00
See application file for complete search history.

(56) References Cited

U.S. PATENT DOCUMENTS

| 6,680,350 B1 | 1/2004 | Dobler |
| 8,633,265 B2 | 1/2014 | Hurst et al. |
| 2003/0125429 A1 | 7/2003 | Joachimi et al. |
| 2004/0253400 A1 | 12/2004 | Wal et al. |
| 2007/0290172 A1 | 12/2007 | Momose et al. |
| 2009/0029172 A1 | 1/2009 | Isozaki |
| 2012/0153241 A1 | 6/2012 | Meyer et al. |
| 2013/0035441 A1 | 2/2013 | de Brouwer et al. |
| 2013/0194658 A1 | 8/2013 | Tamura et al. |
| 2016/0046838 A1 | 2/2016 | Meyer et al. |
| 2016/0289377 A1 | 10/2016 | de Brouwer et al. |
| 2017/0198139 A1 | 7/2017 | Kouno et al. |

FOREIGN PATENT DOCUMENTS

| CN | 101473246 | 7/2009 |
| CN | 103748062 | 4/2014 |
| EP | 1359195 | 11/2003 |
| JP | 2000-143842 | 5/2000 |
| JP | 2003-508615 | 3/2003 |
| JP | 2007016069 | 1/2007 |
| JP | 2009-161744 | 7/2009 |
| JP | 2012058643 | 3/2012 |
| JP | 5166862 | 3/2013 |
| JP | 2014225008 | 12/2014 |
| JP | 2016222788 | 12/2016 |
| JP | 2017149820 | 8/2017 |
| KR | 10-2002-0063908 A | 8/2002 |
| KR | 10-20130129247 | 11/2013 |
| KR | 10-20140054201 | 5/2014 |
| KR | 10-20150100729 | 9/2015 |
| KR | 10-20170036252 | 4/2017 |
| KR | 2017036252 A * | 4/2017 |
| TW | 201704303 | 2/2017 |
| WO | 2016125414 | 8/2016 |
| WO | 2016171194 | 10/2016 |
| WO | 2017146171 | 8/2017 |

OTHER PUBLICATIONS

Machine translation of KR 2017036252 A, published Apr. 3, 2017. (Year: 2017).*

* cited by examiner

*Primary Examiner* — Vickey Nerangis

(74) *Attorney, Agent, or Firm* — Dentons US LLP

(57) ABSTRACT

Provided are a polycarbonate resin composition comprising a polycarbonate resin, a black colorant, a yellow colorant, and at least one ultraviolet absorber selected from the group consisting of a benzotriazole-based compound, a benzophenone-based compound, and a triazine-based compound, and an optical molded article composed thereof.

13 Claims, 1 Drawing Sheet

POLYCARBONATE RESIN COMPOSITION AND OPTICAL MOLDED ARTICLE COMPOSED THEREOF

CROSS-REFERENCE TO RELATED APPLICATIONS

The present application is a National Stage Application of International Application No. PCT/KR2018/011429 filed on Sep. 27, 2018, which claims priority to Korean Patent Application Nos. 10-2017-0128259 and 10-2018-0114401, filed on Sep. 29, 2017 and Sep. 21, 2018, respectively, the disclosures of which are incorporated by reference herein in their entirety.

TECHNICAL FIELD

The present invention relates to a polycarbonate resin composition having excellent transparency and color stability, and low ultraviolet transmittance, and an optical molded article composed thereof.

BACKGROUND ART

Polycarbonate resins are prepared by condensation-polymerization of an aromatic diol such as bisphenol A with a carbonate precursor such as phosgene, and have excellent impact strength, dimensional stability, heat resistance, transparency, etc. Thus, the polycarbonate resins have applicability for a wide range of uses, such as exterior materials of electrical and electronic products, automobile parts, building materials, optical components, etc.

On the other hand, optical lenses used in eyeglasses or sunglasses are required to have transmittance to such an extent that no glare from exterior light sources occurs while not affecting the visual field. Further, it is necessary to protect the eyes from harmful rays of a specific wavelength such as UV. To apply polycarbonate resins having excellent optical properties as well as mechanical properties to optical lenses for outdoor activities such as eyeglasses or sunglasses, a variety of technologies have been developed.

However, polycarbonate resins exhibit low transmittance in a range of about 380 nm or less in the ultraviolet region, but there is a problem in that the transmittance increases in a region above 380 nm. To improve this problem, various additives are used together to control the physical properties of the polycarbonate resins. However, there is a problem in that when any one of physical properties thereof is improved, other physical properties generally deteriorate.

Korean Patent Publication No. 10-2017-0036252 discloses a technique to increase a visible light-shielding property by using the polycarbonate resin in combination with a dye and a pigment, but the technique does not simultaneously realize physical properties such as a proper shielding property in the ultraviolet region and transparency.

PRIOR ART DOCUMENTS

Patent Document (Patent Document 0001) Korean Patent Publication No. 10-2017-0036252

DISCLOSURE

Technical Problem

The present invention provides a polycarbonate resin composition having excellent transparency and color stability, and low ultraviolet transmittance.

Further, the present invention provides an optical molded article including the polycarbonate resin composition.

Technical Solution

To solve the above problem, the present invention provides a polycarbonate resin composition including a polycarbonate resin, a black colorant, a yellow colorant, and at least one ultraviolet absorber selected from the group consisting of a benzotriazole-based compound, a benzophenone-based compound, and a triazine-based compound, each including at least one hydroxyl group, wherein an average transmittance in a wavelength region of 380 nm to 420 nm is 1.0% to 6.5%, as measured in accordance with ASTM D1003.

The polycarbonate resin is a resin prepared by condensation-polymerization of an aromatic diol such as bisphenol A with a carbonate precursor such as phosgene. The polycarbonate resin in itself has excellent mechanical and optical properties, but is required to satisfy many physical properties at the same time according to its application fields. When the polycarbonate resin is used in articles such as lenses for outdoor activities, it is necessary to reduce the transmittance in the ultraviolet region. To improve this, various techniques have been developed, but there has been a problem in that when any one of physical properties thereof is improved, other physical properties generally deteriorate.

Accordingly, in order to realize low ultraviolet transmittance and excellent transparency and color stability at the same time, the present inventors developed a polycarbonate resin composition using an additive having high light absorption in a specific wavelength region and a combination of specific colorants.

Hereinafter, the present invention will be described in detail.

The polycarbonate resin composition according to the present invention can include a specific ultraviolet absorber and a specific combination of colorants to satisfy an average transmittance of 1.0% to 6.5% in a wavelength region of 380 nm to 420 nm, as measured in accordance with ASTM D1003. The resin composition meeting the above range can exhibit low ultraviolet transmittance and excellent transparency and color stability at the same time. The average transmittance of the above range can preferably be 3.0% to 6.2%. When meeting the above range, the resin composition can become excellent in the above-described physical properties, and therefore, it can be easily applied to optical molded articles, particularly lenses for eyeglasses, sunglasses, etc.

In the present invention, the average transmittance is measured in accordance with ASTM D1003, and is obtained by calculating an average value (T380-420) of transmittances which are measured from 380 nm to 420 nm at 5 nm wavelength intervals. In detail, the polycarbonate resin composition of the present invention is prepared as pellets with a twin-screw extruder (L/D=36, Φ=45, barrel temperature 240° C.) at a rate of 80 kg per hour, and the pellets are injection-molded without residence time at a cylinder temperature of about 270° C. using an injection molding machine to prepare a specimen (width/length/thickness=60 mm/40 mm/3 mm), and transmittance is measured in accordance with ASTM D1003 using ULTRASCAN PRO equipment (manufactured by HunterLab).

Ultraviolet Absorber

The polycarbonate resin composition according to the present invention can include at least one ultraviolet absorber selected from the group consisting of a benzotriazole-based compound, a benzophenone-based compound, and a triazine-based compound, each including at least one hydroxyl group. These ultraviolet absorbers can be used together with a specific combination of colorants described below, thereby realizing low ultraviolet transmittance and excellent transparency and color stability at the same time.

Specifically, the ultraviolet absorber is a compound having high light absorption in the UV region of longer than about 380 nm, particularly, at about 420 nm, and can be used together with a specific combination of colorants, thereby improving UV absorption of the polycarbonate resin composition in the corresponding region.

The benzotriazole-based compound includes at least one hydroxyl group in the molecule, and specifically, it can be a compound of the following Chemical Formula 1:

[Chemical Formula 1]

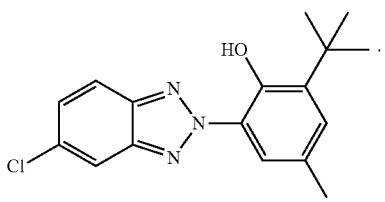

The benzophenone-based compound includes at least one hydroxyl group in the molecule, and specifically, it can be a compound of the following Chemical Formula 2:

[Chemical Formula 2]

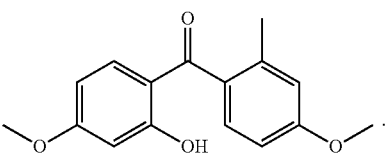

The biazine-based compound includes at least one hydroxyl group in the molecule, and specifically, it can be a compound of the following Chemical Formula 3:

[Chemical Formula 3]

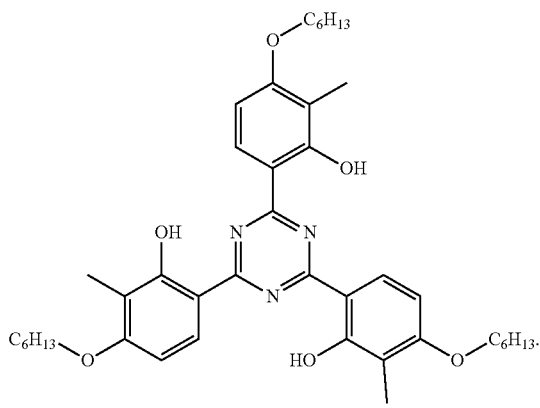

In the present invention, the ultraviolet absorber can be included in an amount from 1000 ppmw to 15,000 ppmw, preferably 3000 ppmw to 10,000 ppmw, or 4000 ppmw to 9000 ppmw with respect to the total dry weight of the composition. The ultraviolet absorber can be included in the above range of the content and used in combination with colorants described below, thereby realizing the desired effects of the present invention.

Colorant

The polycarbonate resin composition according to the present invention includes a black colorant and a yellow colorant at the same time, which are used together with the above-described specific ultraviolet absorber, thereby realizing low ultraviolet transmittance and excellent transparency and color stability at the same time.

In particular, when the black colorant and the yellow colorant are used in combination, it is possible to solve a problem of color stability deterioration which can be generated when the yellow colorant is used alone. Further, due to the synergistic effect thereof, it is possible to realize low light transmittance in the UV region, particularly at 420 nm, and excellent color stability at the same time.

The black colorant can be at least one selected from the group consisting of an anthraquinone-based compound, an azophenyl-based compound, an acetamide-based compound, and a carbon-based compound, and preferably, an anthraquinone-based compound or a carbon-based compound.

A commercially available black colorant can include Nigrosine Black G of BASF, Nigrosin BASE BA of Bayer, Nubian Black PC-0870 of Orient Chemical, ABCOL Nigrosine Z1630 of Abbey Color, etc.

In the present invention, the black colorant can be included in an amount from 1.0 ppmw to 10.0 ppmw, preferably 3.0 ppmw to 5.0 ppmw, or 5.0 ppmw to 7.0 ppmw with respect to the total dry weight of the composition. The black colorant can be included in the above range of the content and used in combination with the ultraviolet absorber of the present invention, thereby realizing the desired effects of the present invention.

The yellow colorant can be at least one selected from the group consisting of a quinoline-based compound, a pyrazole-based compound, and a naphthalene-based compound, and preferably, a quinoline-based compound or a pyrazole-based compound.

A commercially available yellow colorant can include MACROLEX Yellow G of Bayer, Sandoplast Yellow 2G of Clariant, Transparent Yellow 3 of Yabang, Kenawax Yellow BGP of Albion Colours, Solvent Yellow 114 (CAS No. 7576-65-0), etc.

In the present invention, the yellow colorant can be included in an amount from 0.5 ppmw to 5.0 ppmw, preferably 1.0 ppmw to 1.5 ppmw, or 1.5 ppmw to 2.0 ppmw with respect to the total dry weight of the composition. The yellow colorant can be included in the above range of the content and used in combination with the ultraviolet absorber of the present invention, thereby realizing the desired effects of the present invention.

In the present invention, a mixing ratio of the yellow colorant and the black colorant is controlled, thereby efficiently improving optical properties of the polycarbonate resin composition. The mixing ratio of the yellow colorant and the black colorant can be 1:1 to 10:1. The mixing ratio can be preferably 2:1 to 8:1, and more preferably 4:1 to 6:1.

Polycarbonate Resin

The polycarbonate resin according to the present invention is a resin prepared by condensation-polymerization of an aromatic diol such as bisphenol A with a carbonate precursor such as phosgene, and preferably, the polycarbonate resin includes a repeating unit of the following Chemical Formula 4:

[Chemical Formula 4]

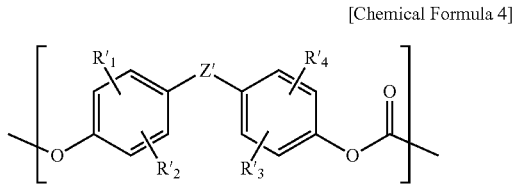

wherein in Chemical Formula 4:

$R'_1$ to $R'_4$ are each independently hydrogen, a $C_{1-10}$ alkyl, a $C_{1-10}$ alkoxy, or a halogen; and Z' is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO.

Preferably, $R'_1$ to $R'_4$ are each independently hydrogen, methyl, chloro, or bromo.

Further, Z' is preferably a linear or branched $C_{1-10}$ alkylene unsubstituted or substituted with a phenyl, and more preferably, methylene, ethane-1,1-diyl, propane-2,2-diyl, butane-2,2-diyl, 1-phenylethane-1,1-diyl, or diphenylmethylene. Further, Z is preferably cyclohexane-1,1-diyl, O, S, SO, $SO_2$, or CO.

The repeating unit of Chemical Formula 4 is formed by reaction of an aromatic diol compound with a carbonate precursor.

Preferably, the repeating unit of Chemical Formula 4 can be derived from any one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

The phrase 'derived from an aromatic diol compound' means that the repeating unit of Chemical Formula 4 is formed by reaction of a hydroxyl group of the aromatic diol compound and a carbonate precursor.

For example, when bisphenol A as the aromatic diol compound is polymerized with triphosgene as the carbonate precursor, the first repeating unit is of the following Chemical Formula 4-1:

[Chemical Formula 4-1]

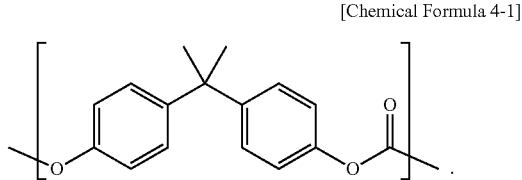

The carbonate precursor can be one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromo phosgene, and bishaloformate. Preferably, triphosgene or phosgene can be used.

The polycarbonate resin according to the present invention can have a weight average molecular weight of 1000 g/mol to 100,000 g/mol, and preferably 15,000 g/mol to 70,000 g/mol.

More preferably, the weight average molecular weight can be 20,000 g/mol or more, 21,000 g/mol or more, 22,000 g/mol or more, 23,000 g/mol or more, 24,000 g/mol or more, 25,000 g/mol or more, 26,000 g/mol or more, 27,000 g/mol or more, or 28,000 g/mol or more. Further, the weight average molecular weight can be 65,000 g/mol or less, 60,000 g/mol or less, or 55,000 g/mol or less.

Polycarbonate Resin Composition

The polycarbonate resin composition according to the present invention can include the above-described polycarbonate resin, black colorant, yellow colorant, and ultraviolet absorber, and can realize excellent transparency and color stability and low ultraviolet transmittance due to the synergistic effect of the combination of the components. In particular, by meeting the average transmittance value in the above-described specific wavelength region, the polycarbonate resin composition can preferably realize excellent physical properties when applied to desired products (particularly, optical molded articles).

The resin composition according to the present invention can further include one or more additives selected from the group consisting of an antioxidant, a heat stabilizer, a plasticizer, an antistatic agent, a nucleating agent, a flame retardant, a lubricant, an impact modifier, a fluorescent brightener, and a radiosorbent, which are commonly used in the art, as needed.

The resin composition according to the present invention can be prepared by mixing a polycarbonate, a cyclic phosphite ester compound, a linear phosphite ester compound, a vinyl-based polymer containing (meth)acrylate repeating units containing an epoxy functional group, and a photoreactive compound containing a phenylene functional group, and optionally, an additive. As described below, the resin composition is preferably prepared as pellets by melt-kneading in order to produce an optical molded article.

The melt-kneading can he performed by methods commonly used in the art, for example, methods using a ribbon blender, a HENSCHEL mixer, a BANBURY mixer, a drum tumbler, a single screw extruder, a twin screw extruder, a co-kneader, a multi-screw extruder, etc. The temperature of the melt-kneading can be adjusted appropriately as needed, and for example, the temperature can be adjusted from 200° C. to 300° C.

Optical Molded Article

Further, the present invention provides an optical molded article including the resin composition. Preferably, the optical molded article can be an optical lens requiring ultraviolet protection, such as a lens for eyeglasses, a lens for sunglasses, etc. The resin composition according to the present invention can have excellent transparency and color stability, and low ultraviolet transmittance, thereby being usefully applied to optical molded articles.

A method of producing the molded article can be a method that is commonly used in the art. For example, a melt-kneaded mixture or pellet of the resin composition according to the present invention as a raw material can be applied to molding methods such as an injection molding method, an injection compression molding method, an extrusion molding method, a vacuum molding method, a blow molding method, a press molding method, a pressure forming method, a foam molding method, a thermal bending molding method, a compression molding method, a calender molding method, a rotational molding method, etc.

The size or thickness of the molded article can be appropriately adjusted in accordance with the purpose of use, and the molded article can have a flat plate or curved shape in accordance with the purpose of use.

Effect of the Invention

As described above, a polycarbonate resin composition according to the present invention can have excellent transparency and color stability, and low ultraviolet transmittance, by using an additive having high light absorption in a specific wavelength region and a combination of specific colorants.

EXAMPLES

Figure 1A:
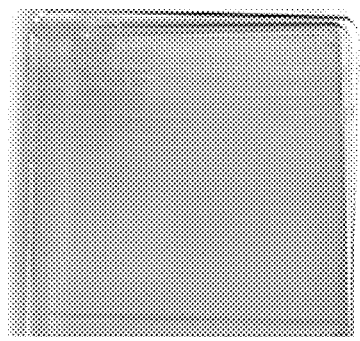
FIGS. 1A-1C are images showing appearance evaluation criteria of examples and comparative examples.

Hereinafter, preferred embodiments will be provided for better understanding of the present invention. However, the following embodiments are for illustrative purposes only, and the present invention is not intended to be limited thereby.

Materials Used

The following materials were used in the examples and comparative examples.

1) (A) Polycarbonate [PC]

Bisphenol A linear polycarbonate resin (A-1) having a weight average molecular weight of 31,000 g/mol and MFR (300° C., 1.2 kg) of 9.5 g/min was used.

2) (B) colorant

B-1: black colorant, Nubian Black PC-0870 manufactured by Orient Chemical

B-2: yellow colorant, Transparent Yellow 3G manufactured by Yabang

B-3: red colorant, MACROLEX Red E2G manufactured by Lanxess 2) (C) ultraviolet absorber C-1: a compound of Chemical Formula 1 (TINUVIN 326)

[Chemical Formula 1]

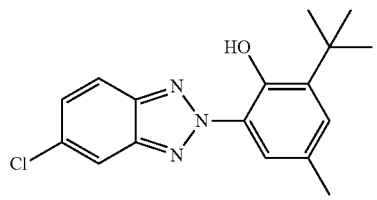

C-2: a compound of Chemical Formula 2 (UVINUL 3049)

[Chemical Formula 2]

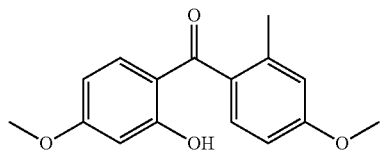

C-3: a compound of Chemical Formula 3 (LA-F70)

[Chemical Formula 3]

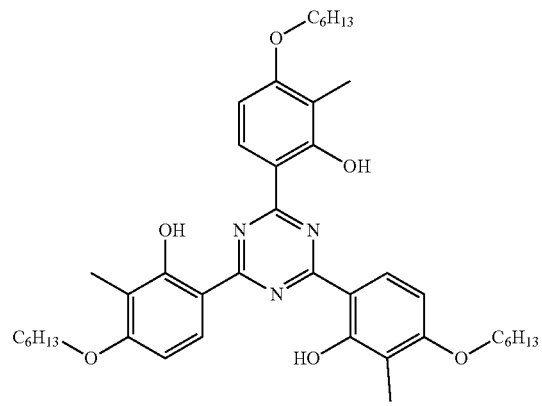

C-4: a compound of Chemical Formula 5 (TINUVIN 360)

[Chemical Formula 5]

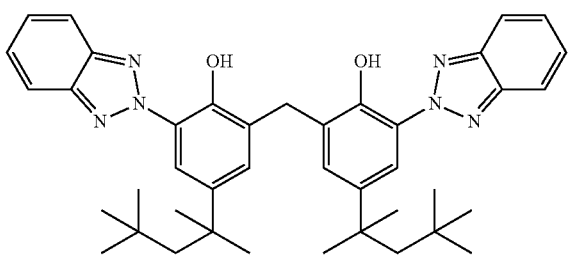

C-5: a compound of Chemical Formula 6 (TINUVIN 329)

[Chemical Formula 6]

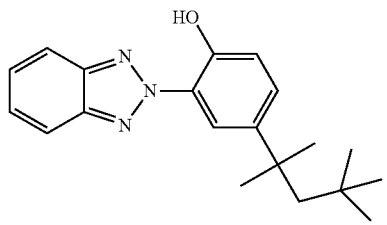

Examples and Comparative Examples

The respective components were mixed in a content as described in Table 1 below, and pellets were produced at a rate of 80 kg per hour with a twin-screw extruder (L/D=36, Φ=45, barrel temperature: 240° C.).

In Table 1, the content of the polycarbonate resin (A) refers to an amount excluding the contents of the remaining colorant (B) and ultraviolet absorber (C) from a total of 100 wt % of the composition.

TABLE 1

| Section | Polycarbonate resin (A) (type/content (wt %)) | Colorant (B) (type/content (ppmw)) | | | Ultraviolet absorber (C) (type/content (ppmw)) | | | | |
|---|---|---|---|---|---|---|---|---|---|
| Example 1 | A-1/balance | B-1/5 | B-2/1 | — | C-1/6000 | — | — | | |
| Example 2 | A-1/balance | B-1/5 | B-2/1 | — | — | C-2/6000 | — | | |
| Example 3 | A-1/balance | B-1/5 | B-2/1 | — | — | — | C-3/6000 | | |
| Example 4 | A-1/balance | B-1/3 | B-2/3 | — | C-1/6000 | — | — | | |
| Example 5 | A-1/balance | B-1/1 | B-2/5 | — | C-1/6000 | — | — | | |
| Example 6 | A-1/balance | B-1/5 | B-2/1 | — | — | C-2/8000 | — | | |
| Example 7 | A-1/balance | B-1/5 | B-2/1 | — | — | — | C-3/10000 | | |
| Comparative Example 1 | A-1/balance | — | — | — | | | | C-4/6000 | |
| Comparative Example 2 | A-1/balance | — | — | — | | | | C-4/8000 | |
| Comparative Example 3 | A-1/balance | B-1/5 | B-2/1 | — | | | | C-4/6000 | |
| Comparative Example 4 | A-1/balance | — | — | — | | | | | C-5/6000 |
| Comparative Example 5 | A-1/balance | B-1/5 | B-2/1 | — | | | | | C-5/6000 |
| Comparative Example 6 | A-1/balance | — | — | — | C-1/6000 | — | — | | |
| Comparative Example 7 | A-1/balance | — | — | — | C-1/8000 | — | — | | |
| Comparative Example 8 | A-1/balance | — | — | — | — | C-2/6000 | — | | |
| Comparative Example 9 | A-1/balance | — | — | — | — | — | C-3/6000 | | |
| Comparative Example 10 | A-1/balance | B-1/6 | — | — | C-1/6000 | — | — | | |
| Comparative Example 11 | A-1/balance | — | B-2/6 | — | C-1/6000 | — | — | | |
| Comparative Example 12 | A-1/balance | — | — | B-3/6 | C-1/6000 | — | — | | |

Experimental Method (1) Experimental Example 1: Transmittance (T), 420 nm Transmittance ($T_{420}$), and 380-420 nm Average Transmittance ($T_{380-420}$)

The respective resin pellets prepared in the examples and comparative examples were injection-molded without residence time at a cylinder temperature of 320° C. using an injection molding machine N-20C (manufactured by JSW, Ltd.) to prepare a specimen (width/length/thickness=60 mm/40 mm/3 mm), while transmittance (T) was measured using ULTRASCAN PRO equipment (manufactured by HunterLab) (instrument setting: 360 nm to 750 nm) in accordance with ASTM D1003, and the results are shown in the following Table 2.

Further, transmittance ($T_{420}$) at 420 nm was measured, and transmittances from 380 nm to 420 nm were also measured at 5 nm wavelength intervals, and an average value thereof ($T_{380-420}$) is shown in the following Table 2.

(2) Experimental Example 2: Evaluation of Color Stability

The color stability was evaluated by combining the following evaluation results of yellowness index and appearance. Higher YI values negatively influence deterioration of color stability, but resins with a YI value of up to about 20 can be applied to products. However, even if the YI value is 20 or less, color stability is considered to be lowered, when a yellow color is observed with the naked eye.

(2-1) Evaluation of Yellowness Index (YI)

The respective resin pellets prepared in the examples and comparative examples were injection-molded without residence time at a cylinder temperature of 270° C. using an injection molding machine N-20C (manufactured by JSW, Ltd.) to prepare a specimen (width/length/thickness=60 mm/40 mm/3 mm), while YI values were measured using ULTRASCAN PRO equipment (manufactured by HunterLab) in accordance with ASTM D1925, and the results are shown in the following Table 2.

(2-2) Evaluation of Appearance

The respective resin pellets prepared in the examples and comparative examples were injection-molded without residence time at a cylinder temperature of 270° C. using an injection molding machine N-20C (manufactured by JSW, Ltd.) to prepare a specimen (width/length/thickness=60 mm/40 mm/3 mm), and yellowness of the specimen was observed with the naked eye. ○, Δ, and X were determined by relative evaluation between the subject specimens.

<Appearance Evaluation Criteria>

○: The sample shows almost no yellow color, which is similar to the sample specimen image of FIG. 1A.

Figure 1B:
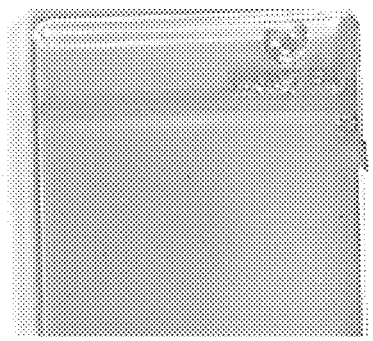

Δ: The sample shows a light yellow color, which is similar to the sample specimen image of FIG. 1B.

Figure 1C:
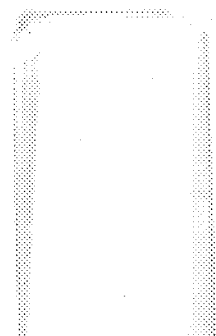

X: The sample shows a dark yellowcolor, which is similar to the sample specimen image of FIG. 1C.

TABLE 2

| Section | YI | Transmittance (T) % | Transmittance at 420 nm ($T_{420}$), % | Average Transmittance at 380 nm-420 nm ($T_{380-420}$), % | Appearance evaluation |
|---|---|---|---|---|---|
| Example 1 | 10.2 | 88.1 | 24.8 | 6.2 | ○ |
| Example 2 | 15.1 | 87.9 | 24.5 | 6.0 | ○ |

TABLE 2-continued

| Section | YI | Transmittance (T) % | Transmittance at 420 nm ($T_{420}$), % | Average Transmittance at 380 nm-420 nm ($T_{380-420}$), % | Appearance evaluation |
|---|---|---|---|---|---|
| Example 3 | 15.2 | 87.8 | 23.4 | 5.8 | ○ |
| Example 4 | 13.4 | 88.4 | 24.3 | 6.0 | ○ |
| Example 5 | 15.5 | 88.2 | 22.5 | 5.6 | ○ |
| Example 6 | 18.8 | 86.9 | 19.5 | 4.8 | ○ |
| Example 7 | 20.1 | 86.1 | 15.2 | 3.7 | ○ |
| Comparative Example 1 | 6.8 | 89.2 | 52.2 | 12.5 | X |
| Comparative Example 2 | 10.2 | 87.8 | 43.4 | 10.6 | X |
| Comparative Example 3 | 7.7 | 86.9 | 42.2 | 10.4 | ○ |
| Comparative Example 4 | 6.5 | 89.5 | 48.8 | 12 | X |
| Comparative Example 5 | 7.5 | 87.5 | 41.2 | 10 | ○ |
| Comparative Example 6 | 7.3 | 89.9 | 31.8 | 7.8 | X |
| Comparative Example 7 | 15.9 | 88.9 | 29.1 | 7.1 | X |
| Comparative Example 8 | 13.5 | 89.6 | 28.9 | 7.1 | X |
| Comparative Example 9 | 13.9 | 89.4 | 28.2 | 7.0 | X |
| Comparative Example 10 | 7.5 | 87.4 | 27.6 | 7.0 | ○ |
| Comparative Example 11 | 18.2 | 88.4 | 22.2 | 6.0 | X |
| Comparative Example 12 | 6.0 | 88.6 | 32.3 | 7.9 | Δ |

As shown in Table 2, examples of the present invention were confirmed to have excellent transparency and low UV transmittance at 420 nm at the same time by using the additive having high light absorption in a specific wavelength region and a combination of the specific colorants. Further, when the samples were observed with the naked eye, they showed almost no yellow color, and their YI values were 20 or less, indicating excellent color stability.

Comparative examples not using the ultraviolet absorber and colorants showed very high 380 nm-420 nm average transmittance, and most of the samples showed a dark yellow color. In particular, it was confirmed that Comparative Examples 1 to 5 using different materials which are conventionally used as ultraviolet absorbers showed overall excellent average transmittance, but remarkably high transmittance at 420 nm, as compared with the examples.

It was confirmed that Comparative Example 11 showed 380 nm-420 nm average transmittance equivalent to those of the examples, but its application to products was not easy because it showed a dark yellow color when observed with the naked eye.

The invention claimed is:

1. A polycarbonate resin composition comprising a polycarbonate resin, a black colorant, a yellow colorant, and at least one ultraviolet absorber selected from the group consisting of a benzotriazole-based compound, a benzophenone-based compound, and a triazine-based compound, wherein:
    an average transmittance in a wavelength region of 380 nm to 420 nm is 1.0% to 6.5%, as measured in accordance with ASTM D1003;
    the yellow colorant is present in an amount from 0.5 ppmw to 5.0 ppmw with respect to the total dry weight of the composition;
    the benzotriazole-based compound is a compound of the following Chemical Formula 1:

[Chemical Formula 1]

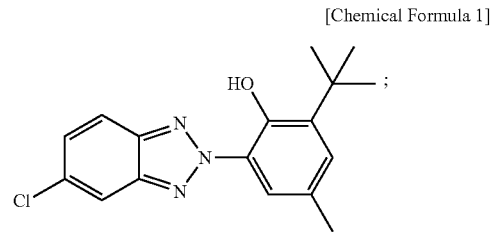 [SMILES: Cc1cc(-n2nc3ccc(Cl)cc3n2)c(O)c(C(C)(C)C)c1]

the benzophenone-based compound is a compound of the following Chemical Formula 2:

[Chemical Formula 2]

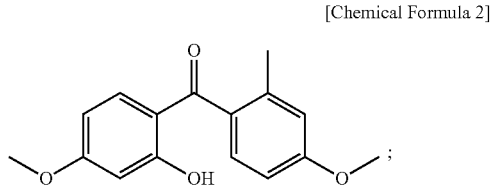

and
the triazine-based compound is a compound of the following Chemical Formula 3:

[Chemical Formula 3]

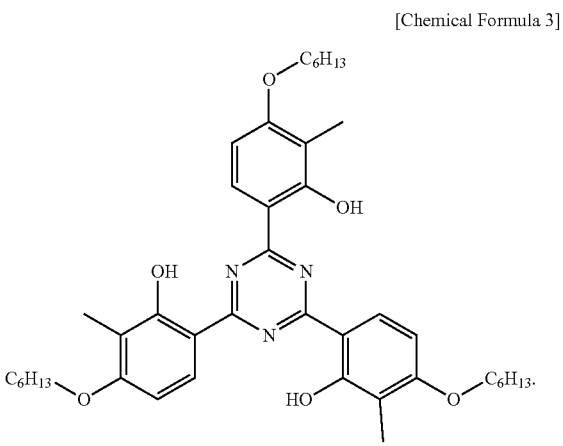

2. The polycarbonate resin composition of claim 1, wherein at least one ultraviolet absorber is the benzotriazole-based compound of Chemical Formula 1.

3. The polycarbonate resin composition of claim 1, wherein at least one ultraviolet absorber is the benzophenone-based compound of Chemical Formula 2.

4. The polycarbonate resin composition of claim 1, wherein at least one ultraviolet absorber is the triazine-based compound of Chemical Formula 3.

5. The polycarbonate resin composition of claim 1, wherein the black colorant is selected from the group consisting of an anthraquinone-based compound, an azophenyl-based compound, an acetamide-based compound, and a carbon-based compound.

6. The polycarbonate resin composition of claim 1, wherein the yellow colorant is selected from the group consisting of a quinoline-based compound, a pyrazole-based compound, and a naphthalene-based compound.

7. The polycarbonate resin composition of claim 1, wherein the ultraviolet absorber is present in an amount from 1000 ppmw to 15,000 ppmw with respect to the total dry weight of the composition.

8. The polycarbonate resin composition of claim 1, wherein the black colorant is present in an amount from 1.0 ppmw to 10.0 ppmw with respect to the total dry weight of the composition.

9. The polycarbonate resin composition of claim 1, wherein the polycarbonate resin includes a repeating unit of the following Chemical Formula 4:

[Chemical Formula 4]

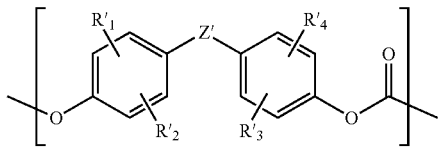

wherein in Chemical Formula 4:
$R'_1$ to $R'_4$ are each independently hydrogen, a $C_{1-10}$ alkyl, a $C_{1-10}$ alkoxy, or a halogen; and
Z' is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO.

10. The polycarbonate resin composition of claim 9, wherein the repeating unit of Chemical Formula 4 is derived from any one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

11. The polycarbonate resin composition of claim 1, wherein the polycarbonate resin has a weight average molecular weight of 1000 g/mol to 100,000 g/mol.

12. The polycarbonate resin composition of claim 1, further comprising at least one additive selected from the group consisting of an antioxidant, a heat stabilizer, a plasticizer, an antistatic agent, a nucleating agent, a flame retardant, a lubricant, an impact modifier, and a fluorescent brightener.

13. An optical molded article, comprising the polycarbonate resin composition of claim 1.

* * * * *